UNITED STATES PATENT OFFICE.

ROBERT GLENNON, OF NEW ORLEANS, LOUISIANA.

IMPROVEMENT IN ROOFING-CEMENT COMPOSITION.

Specification forming part of Letters Patent No. 19,695, dated March 23, 1858.

*To all whom it may concern:*

Be it known that I, ROBERT GLENNON, of the city of New Orleans, parish of Orleans, State of Louisiana, have made a new and useful composition of matter for the purpose of rendering wood impervious to water on being surface-coated therewith, which can be employed in the coating the surfaces of metals or canvas that is intended to be used for roofing and such similar purposes; and I hereby declare the following is a full and exact description of the mode of compounding and putting into practical use, with the names of the materials employed to produce the composition.

The subject-matters being composed of fluids and solids, I will give the relative proportion of each ingredient separately, with the mode of mixture as a whole. Any variation from one portion of the material used will require a corresponding variation of the others, in order to keep each portion in correct combination. I mix as a first composition three gallons of the spirits of turpentine with five pounds of Vandyke brown, and stir the mixture well to cause these two bodies to become blended and both take the fluid state, this mixture to be kept until others are prepared. I mix as a second composition three gallons of alcohol with five pounds of gum-shellac. This also is to be stirred as composition first. I mix as a third composition five gallons of linseed-oil, (boiled,) one pound of oil of amber, one gallon of Japan varnish, six pounds of sulphate of zinc, and forty-six gallons of coal-tar, all these ingredients well mixed together. I then mix the first, second, and third compositions all together, thus making the fluid portion, the solid portion being composed as follows: one-half bushel of fresh slaked lime; four quarts of plaster-of-paris; four quarts of red ocher; four quarts of Spanish whiting, these ingredients to be mixed together and dried in an oven. After being thus prepared keep the same in a tight vessel to prevent the action of the atmosphere from injuring it.

Immediately before applying the composition as a coating on the material to be preserved, for each gallon of the fluid mix with the same one pint of the solid, and stir well together.

In putting on this composition as a coating the same is done as putting on paints. One coat is put on for a base and allowed to become dry before another coat is put on. Then put on a second coat, and put as much clean sand on this coat as the fluid nature of the composition will take. After this second coat has become dry add another coat of the composition with the sand, which can be continued in this manner to make the covering hold as thick a body as desired; but I find that two coats sanded is a good protection in roofing and for many purposes. The composition with the sand gives a surface similar to that of stone, and offers great safety from fire falling on the roofs of buildings, and being of tenacious nature adheres firmly to the surface on which it is applied, and does not break in scales or crack to injure the covering in being a protection from leakage of water, the heat of the sun having no influence in softening the composition, the modes of application being uniform, but the appliances being various. It can be used in coating walls, floors, cisterns, railroad-timbers, canvas roofing, and a vast variety of purposes.

By the Spanish whiting referred to I design to be understood as meaning the article whose constituent is carbonate of lime.

Having described my invention and the manner of using the same, I disclaim the compositions patented by R. H. Smith and C. R. Milks in 1837 as differing from my invention.

What I do claim, and desire to secure by Letters Patent, is—

The composition made up of the ingredients hereinbefore specified, in substantially the proportions and in the manner set forth.

ROBERT GLENNON.

Witnesses:
C. H. HORTON,
FRANCIS ARMSTRONG.